United States Patent
Ashok et al.

(10) Patent No.: US 9,720,853 B2
(45) Date of Patent: Aug. 1, 2017

(54) UNIVERSAL SERIAL BUS (USB) KEY FUNCTIONING AS MULTIPLE USB KEYS SO AS TO EFFICIENTLY CONFIGURE DIFFERENT TYPES OF HARDWARE

(71) Applicant: International Business Machines Corporation, Armonk, NY (US)

(72) Inventors: Rohith K. Ashok, Apex, NC (US); Michael J. Burr, Cary, NC (US); Hugh E. Hockett, Raleigh, NC (US); Michael S. Law, Morrisville, NC (US); Matthew J. Sheard, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 13/854,200

(22) Filed: Apr. 1, 2013

(65) Prior Publication Data

US 2014/0297895 A1  Oct. 2, 2014

Related U.S. Application Data

(63) Continuation of application No. 13/853,323, filed on Mar. 29, 2013.

(51) Int. Cl.
*G06F 3/00* (2006.01)
*G06F 13/10* (2006.01)
(Continued)

(52) U.S. Cl.
CPC ............ *G06F 13/10* (2013.01); *G06F 13/102* (2013.01); *G06F 9/4411* (2013.01); *G06F 13/385* (2013.01); *G06F 2221/2153* (2013.01)

(58) Field of Classification Search
None
See application file for complete search history.

(56) References Cited

U.S. PATENT DOCUMENTS 6,636,929 B1  10/2003  Frantz et al.
6,957,179 B2  10/2005  Debling
(Continued)

FOREIGN PATENT DOCUMENTS

CN      2824442 Y   10/2006
CN    102542200 A    7/2012
(Continued)

OTHER PUBLICATIONS

Office Action for U.S. Appl. No. 13/853,250 dated May 6, 2014, pp. 1-30.
(Continued)

*Primary Examiner* — Henry Tsai
*Assistant Examiner* — Aurangzeb Hassan
(74) *Attorney, Agent, or Firm* — Robert A. Voigt, Jr.; Winstead, P.C.

(57) ABSTRACT

A method, data storage device and computer program product for efficiently configuring different types of hardware components. A Universal Serial Bus (USB) key is preloaded with multiple profiles, where each profile contains a configuration file(s) associated with a particular type of hardware component. Upon plugging the USB key into a hardware component, the USB key recognizes the type of hardware component based on the properties of the hardware component available on the USB interface. The USB key identifies a profile containing the configuration file(s) associated with the recognized type of hardware component. The USB key then presents the configuration file(s) contained in the identified profile to the connected hardware component. Such a process may be repeated for configuring another type of hardware component. In this manner, the user is able to efficiently configure different types of hardware by having the USB key function as multiple USB keys.

7 Claims, 6 Drawing Sheets

(51) Int. Cl.
*G06F 13/38* (2006.01)
*G06F 9/44* (2006.01)

(56) References Cited

U.S. PATENT DOCUMENTS

| | | |
|---|---|---|
| 7,383,547 B1 | 6/2008 | Miri |
| 7,418,377 B2 | 8/2008 | Poley et al. |
| 7,418,524 B2 | 8/2008 | Beasley et al. |
| 7,555,570 B2 | 6/2009 | Hickey et al. |
| 7,702,830 B2 | 4/2010 | Brunet et al. |
| 7,715,834 B2 | 5/2010 | Hibino |
| 7,813,913 B2 | 10/2010 | Collins et al. |
| 7,844,445 B2 | 11/2010 | Brunet et al. |
| 7,844,749 B2 | 11/2010 | Tredoux et al. |
| 7,899,662 B2 | 3/2011 | Brunet et al. |
| 8,001,303 B2 | 8/2011 | Brundridge et al. |
| 8,219,653 B1 | 7/2012 | Keagy et al. |
| 8,661,281 B2 | 2/2014 | Chang et al. |
| 2005/0080973 A1* | 4/2005 | Lee ............... 710/311 |
| 2005/0209842 A1 | 9/2005 | Klein |
| 2005/0240712 A1 | 10/2005 | Klein |
| 2007/0162271 A1 | 7/2007 | Brunet et al. |
| 2007/0168481 A1 | 7/2007 | Lambert et al. |
| 2007/0186277 A1 | 8/2007 | Loesch et al. |
| 2007/0225962 A1 | 9/2007 | Brunet et al. |
| 2008/0082813 A1* | 4/2008 | Chow et al. ............ 713/2 |
| 2008/0098172 A1 | 4/2008 | Tsang et al. |
| 2008/0181412 A1 | 7/2008 | Acar et al. |
| 2008/0189095 A1 | 8/2008 | Chen et al. |
| 2008/0195790 A1 | 8/2008 | Self |
| 2009/0055514 A1* | 2/2009 | Tebbs et al. ............ 709/220 |
| 2009/0089460 A1 | 4/2009 | Komoda |
| 2009/0144469 A1* | 6/2009 | Brundridge et al. ....... 710/74 |
| 2009/0300151 A1 | 12/2009 | Friedman et al. |
| 2010/0011358 A1 | 1/2010 | Kettler et al. |
| 2011/0047128 A1 | 2/2011 | Brunet et al. |
| 2012/0131331 A1 | 5/2012 | Benson |
| 2013/0060929 A1* | 3/2013 | Koponen et al. ......... 709/224 |

FOREIGN PATENT DOCUMENTS

| | | |
|---|---|---|
| KR | 20110105447 A | 9/2011 |
| WO | 2012111018 A1 | 8/2012 |

OTHER PUBLICATIONS

Blair et al., "Method to Identify Multiple Identical USB Devices," IPCOM000123624D, Feb. 1, 1999, pp. 1-3.

Anonymously, "Method for Emulating a Remote Gaming DMA," IPCOM000135374D, Apr. 11, 2006, pp. 1-6.

Liao et al., "Sharing Virtual USB Device in Virtualized Desktop," 2011 Fourth International Symposium on Parallel Architectures, Algorithms and Programming, IEEE Computer Society, 2011, pp. 156-160.

"PC as USB Device Emulator," http://www.microchip.com/forums/m407943-print.aspx, 2012, pp. 1-7.

Office Action for U.S. Appl. No. 13/854,213 dated Sep. 11, 2014, pp. 1-30.

Office Action for U.S. Appl. No. 13/854,213 dated Jan. 2, 2015, pp. 1-23.

Office Action for U.S. Appl. No. 13/853,491 dated Sep. 22, 2014, pp. 1-30.

Office Action for U.S. Appl. No. 13/853,491 dated Feb. 19, 2015, pp. 1-29.

Office Action for U.S. Appl. No. 13/853,250 dated Oct. 22, 2014, pp. 1-38.

Office Action for U.S. Appl. No. 13/853,323 dated Dec. 18, 2014, pp. 1-43.

Office Action for U.S. Appl. No. 13/853,323 dated Jun. 5, 2014, pp. 1-10.

Office Action for U.S. Appl. No. 13/853,323 dated Jan. 30, 2014, pp. 1-15.

Mell et al., "The NIST Definition of Cloud Computing," Special Publication 800-145, Sep. 2011.

U.S. Patent Application entitled "A Multi-User Universal Serial Bus (USB) Key with Customizable File Sharing Permissions" filed on Mar. 29, 2013.

U.S. Patent Application entitled "Emulating Multiple Universal Serial Bus (USB) Keys so as to Efficiently Configure Different Types of Hardware" filed on Mar. 29, 2013.

* cited by examiner

UNIVERSAL SERIAL BUS (USB) KEY FUNCTIONING AS MULTIPLE USB KEYS SO AS TO EFFICIENTLY CONFIGURE DIFFERENT TYPES OF HARDWARE

CROSS-REFERENCE TO RELATED APPLICATIONS

The present application is a continuation application of pending U.S. patent application Ser. No. 13/853,323, which was filed on Mar. 29, 2013, which is assigned to the assignee of the present invention. The present application claims priority benefits to U.S. patent application Ser. No. 13/853,323.

TECHNICAL FIELD

The present invention relates generally to cloud computing, and more particularly to a Universal Serial Bus (USB) key functioning as multiple USB keys so as to efficiently configure different types of hardware of the cloud computing environment.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

The functions of the cloud computing environment are performed by a data center, which includes various types of hardware components (e.g., storage controllers, network switches, physical compute machines). In order for the hardware component to be fully operational, the hardware component has to be configured thereby specifying the hardware, software, firmware and documentation of the hardware component.

Currently, such hardware components are configured by installing software on a computing device (e.g., laptop computer) to build a configuration file for the hardware component. Once the user of the computing device has selected the settings (e.g., Internet Protocol (IP) address, subnet mask, format of disks, topology of disks) to be included in the configuration file, the configuration file is stored on a Universal Serial Bus (USB) flash drive (also referred to as a "USB key") plugged into the computing device. The USB key is then plugged into the hardware component which automatically detects the USB key and runs the configuration file stored on the USB key.

Unfortunately, such a process in configuring a hardware component has to be repeated for each different type of hardware component that needs to be configured. As a result, the process becomes burdensome and labor intensive when you have a large number of different types of hardware components that need to be configured.

BRIEF SUMMARY

In one embodiment of the present invention, a method for efficiently configuring different types of hardware components comprises preloading a data storage device with a plurality of profiles, where each of the plurality of profiles contains a configuration file associated with a particular type of hardware component and rules for presenting the configuration file to the particular type of hardware component, where the data storage device comprises a flash memory with an integrated Universal Serial Bus (USB) interface. The method further comprises plugging the data storage device into a first hardware component. Additionally, the method comprises recognizing the first hardware component out of a plurality of hardware components. Furthermore, the method comprises identifying a first profile out of the plurality of profiles containing a first configuration file associated with the first hardware component in response to recognizing the first hardware component. In addition, the method comprises presenting, by a controller, the first configuration file to the first hardware component based on the rules of the first profile.

Other forms of the embodiment of the method described above are in a data storage device and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, data storage device and computer program product for efficiently configuring different types of hardware components. In one embodiment of the present invention, a Universal Serial Bus (USB) key is preloaded with multiple profiles, where each profile contains a configuration file(s) associated with a particular type of hardware component that needs to be configured. Furthermore, the USB key is preloaded with rules for presenting the configuration file(s) to the particular type of hardware component. Upon plugging the USB key into a hardware component, the USB controller of the USB key recognizes the type of hardware component (e.g., IBM® Storwize v7000 storage controller) out of a plurality of different types of hardware components (e.g., network switches, storage controllers, compute blades) based on the properties (e.g., name, type, serial number) of the hardware component available on the USB interface using the USB plug and play capabilities. The USB controller identifies a profile out of the plurality of profiles containing the configuration file(s) associated with the recognized type of hardware component. The USB controller then presents the configuration file(s) contained in the identified profile to the connected hardware component based on the rules of the profile so as to configure the hardware component. Such a process may be repeated for configuring another type of hardware component by plugging the USB key into another type of hardware component whereby the USB controller will recognize the newly connected hardware component, identify the appropriate profile containing the configuration file(s) associated with the newly recognized type of hardware component and present the configuration file(s) contained in the identified profile to the newly connected hardware component based on the rules of the profile. In this manner, the user is able to efficiently configure different types of hardware by having the USB key function as multiple USB keys.

While the following discusses the present invention in connection with presenting configuration file(s) to the hardware component for configuring the hardware component, the principles of the present invention may be applied to providing any type of file to the hardware component that is deemed to be necessary to be received by the hardware component. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
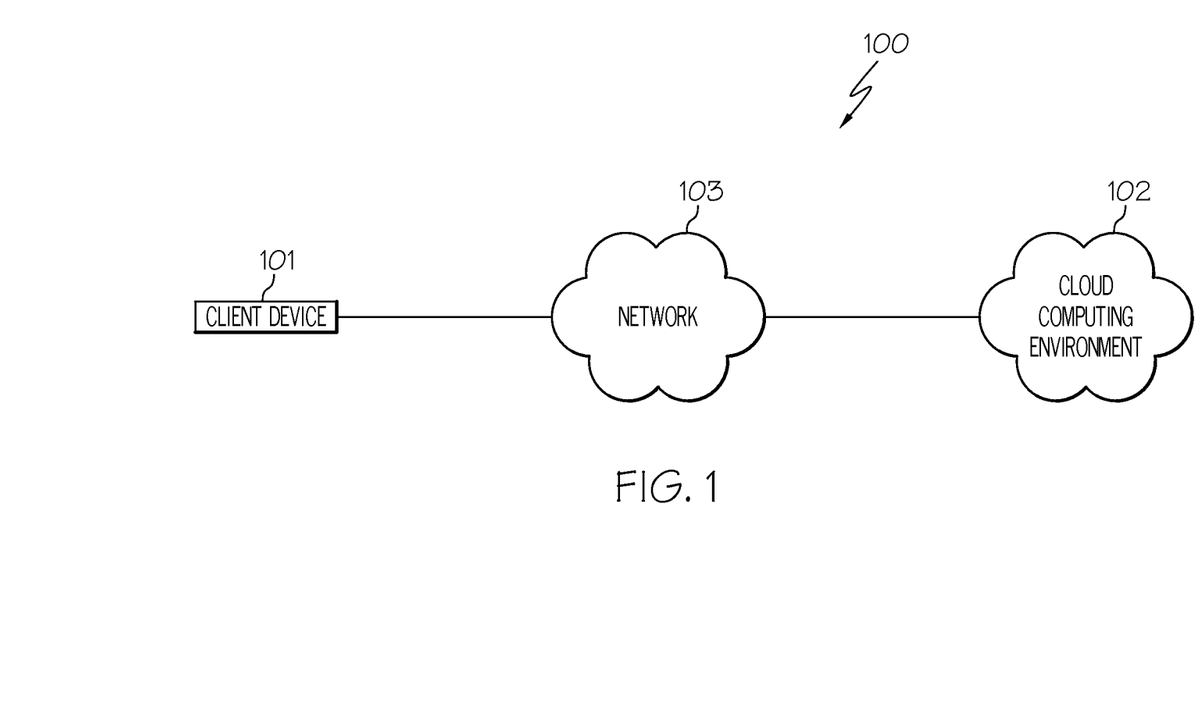
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
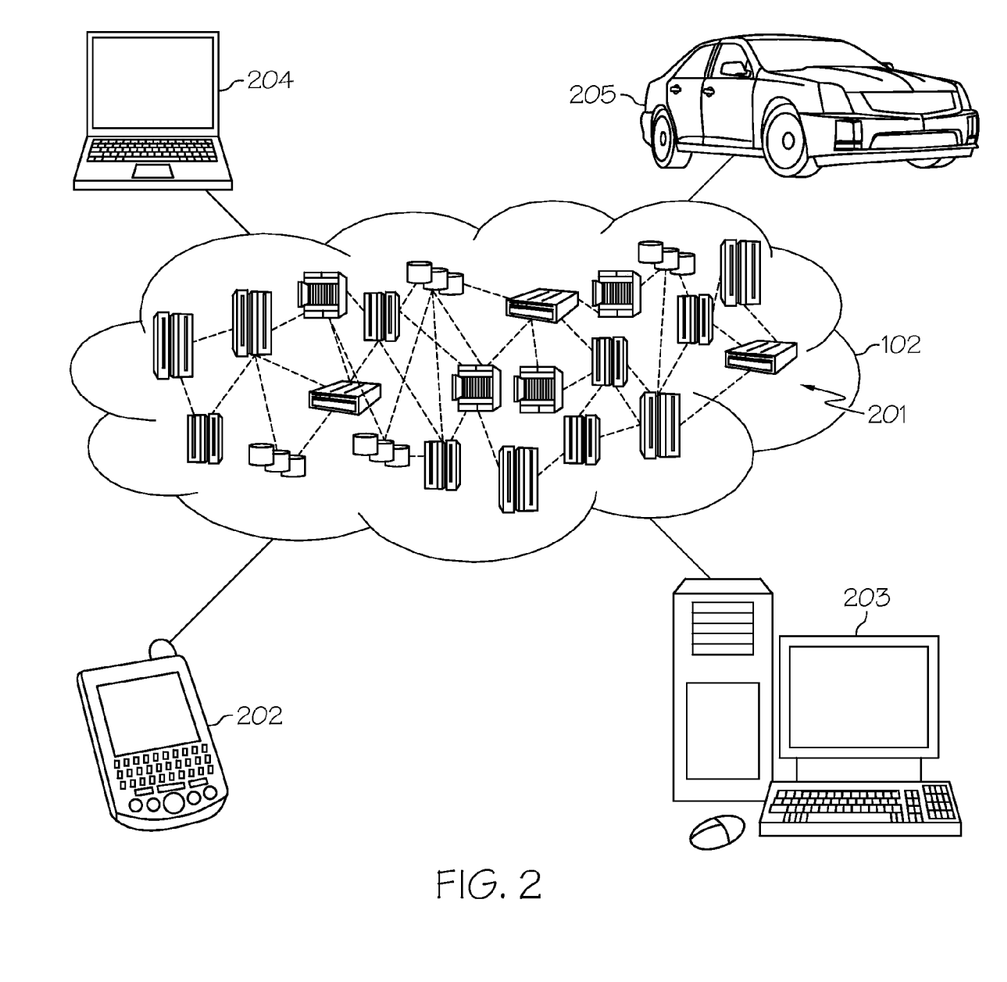
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of exemplary cloud computing nodes 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing node 201 may store program code on a computer readable storage medium on the server computer. The server computer may download the program code to computing device 202, 203, 204, 205 for use on the computing device.

Figure 3:
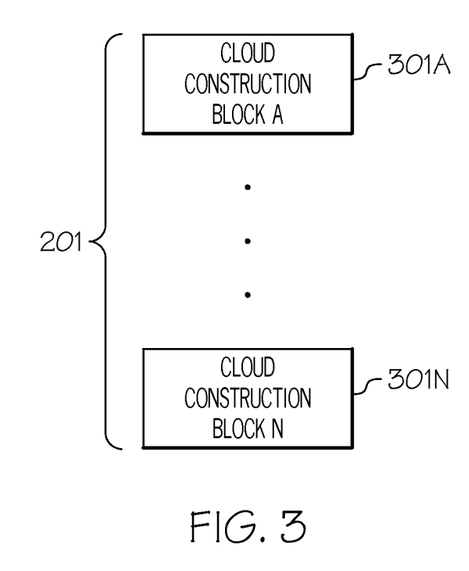
FIG. 3 illustrates a cloud computing node comprised of one or more cloud construction blocks in accordance with an embodiment of the present invention.

Referring now to FIG. 3, FIG. 3 illustrates a schematic of a cloud computing node 201 comprised of one or more "cloud construction blocks" 301A-301N in accordance with an embodiment of the present invention. Cloud construction blocks 301A-301N may collectively or individually be referred to as cloud construction blocks 301 or cloud construction block 301, respectively. Each cloud construction block 301 may be represented by a single unit that includes various types of hardware components (e.g., storage controllers, network switches, physical compute machines) as illustrated in FIG. 4.

Figure 4:
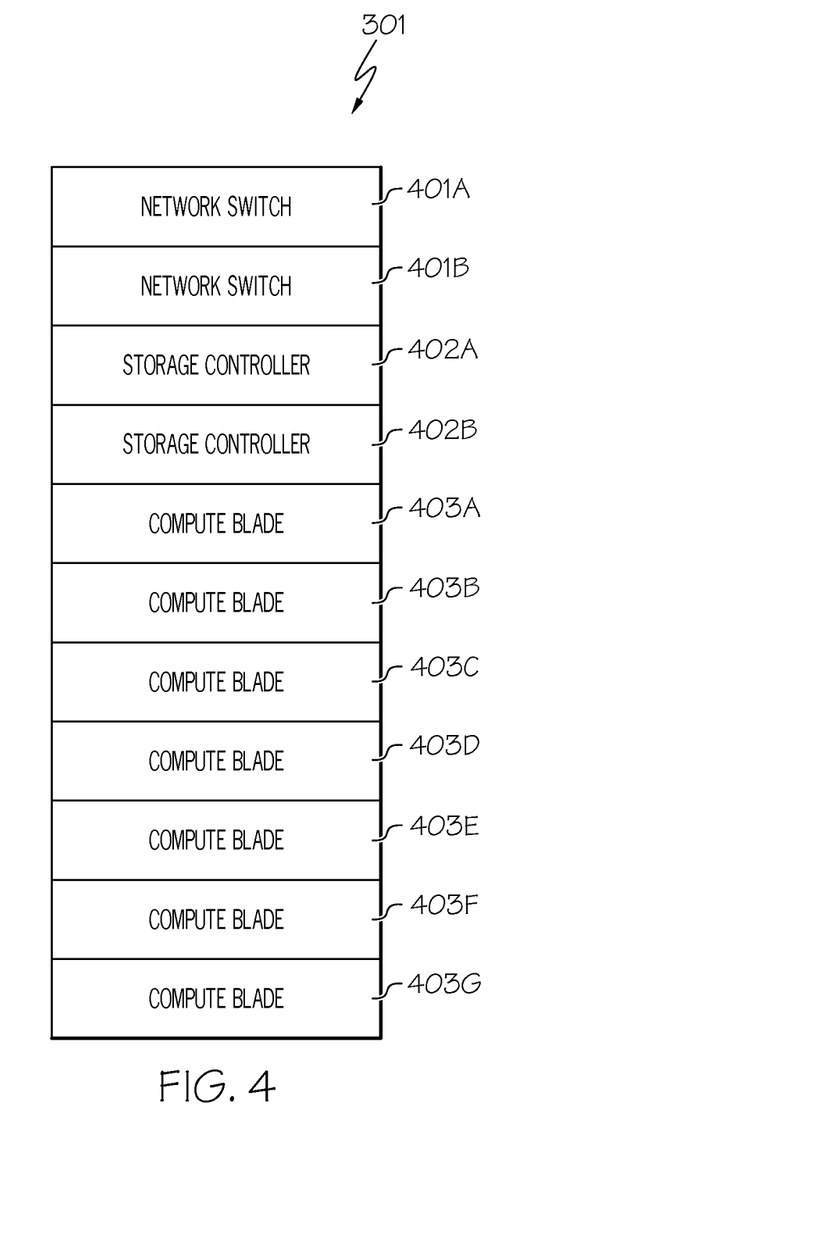
FIG. 4 illustrates a physical layout of a cloud construction block in accordance with an embodiment of the present invention.

Referring now to FIG. 4, FIG. 4 illustrates a physical layout of a cloud construction block 301 in accordance with an embodiment of the present invention. Referring to FIG. 4, cloud construction block 301 may comprise a rack of many units containing network hardware (e.g., network switches 401A, 401B), storage hardware (e.g., storage controllers 402A, 402B), and compute hardware (e.g., compute blades 403A-403G). Network switches 401-401B may collectively or individually be referred to as network switches 401 or network switch 401, respectively. Storage controllers 402A-402B may collectively or individually be referred to as storage controllers 402 or storage controller 402. Compute blades 403A-403G may collectively or individually be referred to as compute blades 403 or compute blade 403, respectively.

While FIG. 4 illustrates cloud construction block 301 as comprising a particular number of network switches 401, storage controllers 402 and compute blades 403, cloud construction block 301 is not to be limited in scope to the particular number of components depicted in FIG. 1. Furthermore, cloud construction block 301 may include other components, including software, that were not depicted for ease of understanding the principles of the present invention.

As stated in the Background section, the functions of the cloud computing environment are performed by a data center, which includes various types of hardware components (e.g., storage controllers, network switches, physical compute machines). In order for the hardware component to be fully operational, the hardware component has to be configured thereby specifying the hardware, software, firmware and documentation of the hardware component. Currently, such hardware components are configured by installing software on a computing device (e.g., laptop computer) to build a configuration file for the hardware component. Once the user of the computing device has selected the settings (e.g., Internet Protocol (IP) address, subnet mask, format of disks, topology of disks) to be included in the configuration file, the configuration file is stored on a Universal Serial Bus (USB) flash drive (also referred to as a "USB key") plugged into the computing device. The USB key is then plugged into the hardware component which automatically detects the USB key and runs the configuration file stored on the USB key. Unfortunately, such a process in configuring a hardware component has to be repeated for each different type of hardware component that needs to be configured. As a result, the process becomes burdensome and labor intensive when you have a large number of different types of hardware components that need to be configured.

Figure 5:
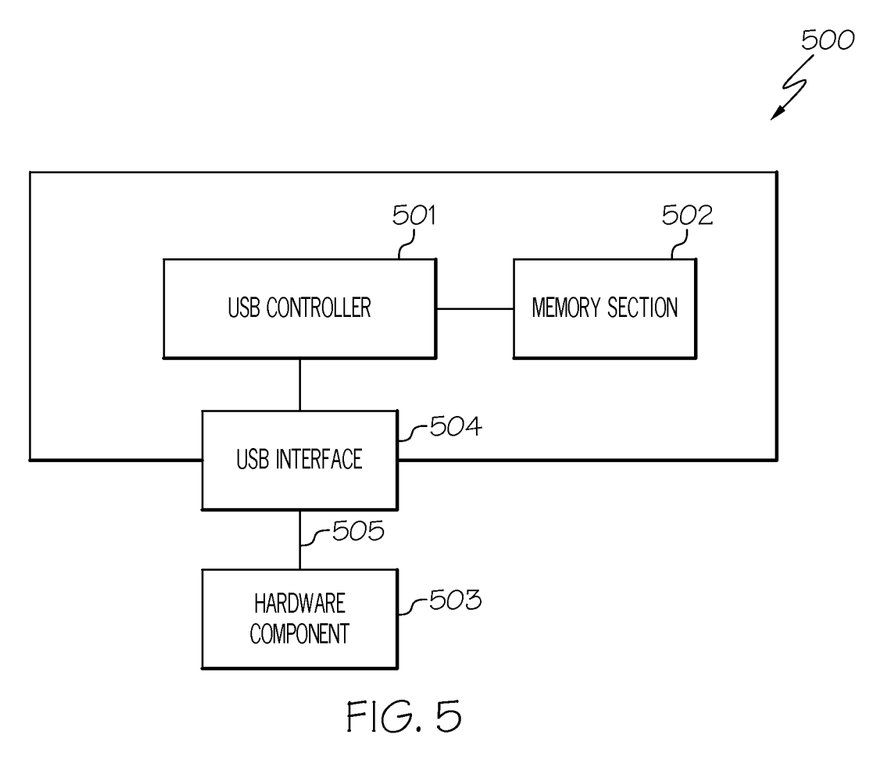
FIG. 5 illustrates a Universal Serial Bus (USB) key that functions as multiple USB keys so as to efficiently configure different types of hardware in accordance with an embodiment of the present invention.
Figure 6:
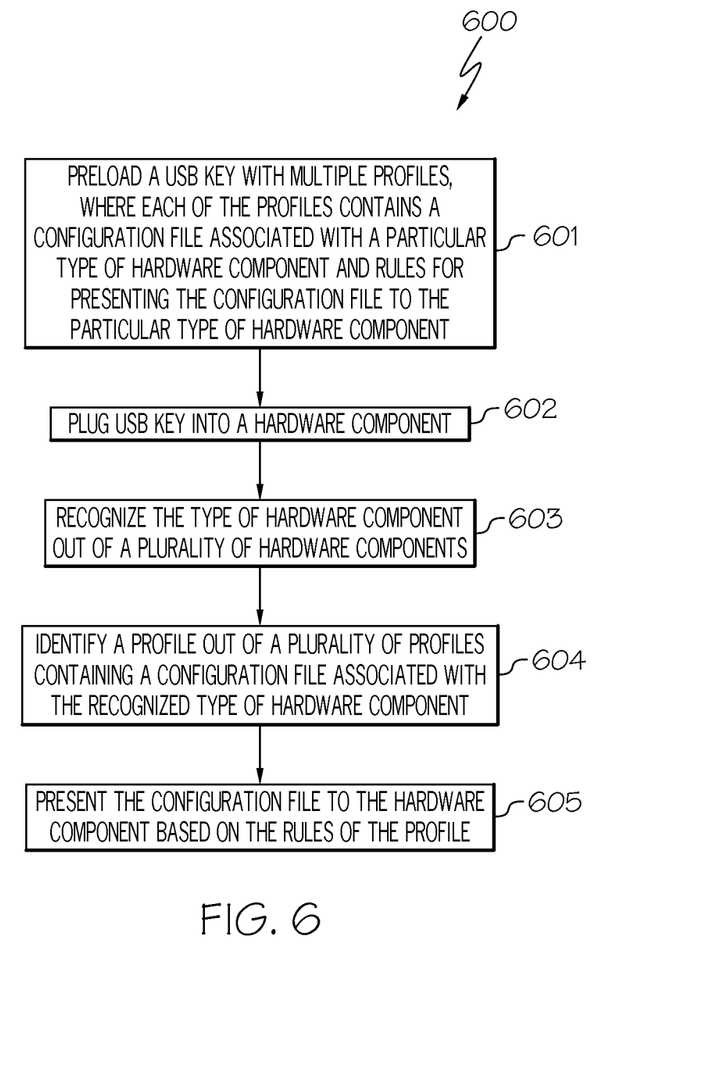
FIG. 6 is a flowchart of a method for efficiently configuring different types of hardware components using a USB key that functions as multiple USB keys in accordance with an embodiment of the present invention.

The principles of the present invention provide a means for configuring a large number of different types of hardware components that need to be configured in a less burdensome and a less labor intensive manner by having a Universal Serial Bus (USB) key function as multiple USB keys so as to efficiently configure different types of hardware as discussed below in connection with FIGS. 5-6. FIG. 5 illustrates a USB key that functions as multiple USB keys so as to efficiently configure different types of hardware. FIG. 6 is a flowchart of a method for efficiently configuring different types of hardware components using a USB key that functions as multiple USB keys.

Referring now to FIG. 5, FIG. 5 illustrates a Universal Serial Bus (USB) key 500 that functions as multiple USB keys so as to efficiently configure different types of hardware in accordance with an embodiment of the present invention. In one embodiment, USB key 500 includes a USB controller 501 connected to a memory section 502 which is a non-volatile semiconductor memory, such as a flash memory. In one embodiment, USB controller 501 is configured to control the communication between USB key 500 and a hardware component 503 (e.g., network switch 401, storage controller 402 and compute blade 403 of FIG. 4) via a USB interface 504, including establishment of the USB communication (e.g., USB 2.0, USB 3.0), transmission of various data as well as the presentation of configuration file(s) to hardware component 503 via USB connection 505 for configuring hardware component 503 as discussed below.

In one embodiment, memory section 502 is preloaded with multiple profiles, where each profile contains a configuration file(s) associated with a particular type of hardware component (e.g., IBM® Storwize v7000 storage controller 402) that needs to be configured. In one embodiment, the configuration file(s) include one or more of the following settings: Internet Protocol address, subnet mask, formation of disk and topology of disk. Furthermore, memory section 502 is preloaded with rules for presenting the configuration file(s) to the particular type of hardware component.

Upon plugging USB key 500 into hardware component 503 (e.g., network switch 401, storage controller 402 and compute blade 403), USB controller 501 presents only the appropriate configuration file(s) to the connected hardware component 503 as discussed further below in connection with FIG. 6. For example, when USB key 500 is plugged into storage controller 402, USB key 500 presents the appropriate configuration file(s) that are associated with storage controller 402 and hides the other configuration file(s) (e.g., configuration file(s) for network switch 401) stored in memory section 502. If, however, USB key 500 is plugged into network switch 401, then USB key 500 presents the appropriate configuration file(s) that are associated with network switch 401 and hides the other configuration file(s) (e.g., configuration file(s) for storage controller 402) stored in memory section 502. By having a USB key 500 that stores multiple profiles, each containing a configuration file(s) associated with a particular type of hardware component (e.g., IBM® Storwize v7000 storage controller 402) that needs to be configured, USB key 500 can function as multiple USB keys configuring different types of hardware as discussed further below in connection with FIG. 6.

In one embodiment, memory section 502 is configured to store a program for efficiently configuring different types of hardware components, as discussed herein, and USB controller 501 is configured to execute the instructions of said program.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As discussed above, USB key 500 can function as multiple USB keys configuring different types of hardware as discussed in connection with FIG. 6.

FIG. 6 is a flowchart of a method 600 for efficiently configuring different types of hardware components using USB key 500 (FIG. 5) that functions as multiple USB keys in accordance with an embodiment of the present invention.

Referring to FIG. 6, in conjunction with FIGS. 1-5, in step 601, USB key 500 is preloaded with multiple profiles, where each profile contains a configuration file(s) associated with a particular type of hardware component (e.g., IBM® Storwize v7000 storage controller 402) that needs to be configured. In one embodiment, the configuration file(s) include one or more of the following settings: Internet Protocol address, subnet mask, formation of disk and topology of disk. Furthermore, memory section 502 is preloaded with rules for presenting the configuration file(s) to the particular type of hardware component.

In step 602, USB key 500 is plugged into hardware component 503 (e.g., network switch 401, storage controller 402 and compute blade 403) to be configured.

In step 603, upon plugging USB key 500 into hardware component 503, USB controller 501 recognizes the type of hardware component 503 (e.g., IBM® Storwize v7000 storage controller 402) out of a plurality of different types of hardware components (e.g., network switches 401, storage controllers 402, compute blades 403) based on the properties (e.g., name, type, serial number) of hardware component 503 available on USB interface 504 using the USB plug and play capabilities.

In step 604, USB controller 501 identifies a profile out of the plurality of profiles stored in memory section 502 containing the configuration file(s) associated with the recognized type of hardware component. For example, USB key 500 identifies the profile for hardware type A in response to recognizing hardware type A and identifies the profile for hardware type B in response to recognizing hardware type B.

In step 605, USB controller 501 presents the configuration file(s) contained in the identified profile to hardware component 503 (referring to the hardware component 503 that USB key 500 is plugged into) based on the rules of the profile so as to configure hardware component 503. USB controller 501 hides the other configuration file(s) that are associated with different types of hardware components. For example, when USB key 500 is plugged into storage controller 402, USB key 500 presents the appropriate configuration file(s) that are associated with storage controller 402 and hides the other configuration file(s) (e.g., configuration file(s) for network switch 401) stored in memory section 502. If, however, USB key 500 is plugged into network switch 401, then USB key 500 presents the appropriate configuration file(s) that are associated with network switch 401 and hides the other configuration file(s) (e.g., configuration file(s) for storage controller 402) stored in memory section 502.

Steps 602-605 of method 600 can be repeated for configuring another type of hardware component 503 by plugging USB key 500 into another type of hardware component 503. USB controller will then recognize the newly connected hardware component 503, identify the appropriate profile containing the configuration file(s) associated with the newly recognized type of hardware component and present the configuration file(s) contained in the identified profile to the newly connected hardware component 503 based on the rules of the profile. In this manner, the user is able to efficiently configure different types of hardware by having USB key 500 function as multiple USB keys.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for efficiently configuring different types of hardware components, the method comprising:

preloading a data storage device with a plurality of profiles, wherein each of said plurality of profiles contains a configuration file associated with a particular type of hardware component and rules for presenting said configuration file to said particular type of hardware component, wherein said data storage device comprises a flash memory with an integrated Universal Serial Bus (USB) interface;

plugging said data storage device into a first hardware component;

recognizing said first hardware component out of a plurality of hardware components;

identifying a first profile out of said plurality of profiles containing a first configuration file associated with said first hardware component in response to recognizing said first hardware component; and presenting, by a controller, said first configuration file to said first hardware component based on said rules of said first profile.

2. The method as recited in claim 1, wherein said first hardware component is recognized based on one or more properties available on said USB interface.

3. The method as recited in claim 2, wherein said properties comprise one or more of the following: name, type and serial number.

4. The method as recited in claim 1, wherein other configuration files associated with other hardware components are hidden from said first hardware component.

5. A method for efficiently configuring different types of hardware components, the method comprising:

preloading a data storage device with a plurality of profiles, wherein each of said plurality of profiles contains a configuration file associated with a particular type of hardware component and rules for presenting said configuration file to said particular type of hardware component, wherein said data storage device comprises a flash memory with an integrated Universal Serial Bus (USB) interface;

plugging said data storage device into a first hardware component;

recognizing said first hardware component out of a plurality of hardware components;

identifying a first profile out of said plurality of profiles containing a first configuration file associated with said first hardware component in response to recognizing said first hardware component;

presenting, by a controller, said first configuration file to said first hardware component based on said rules of said first profile;

plugging said data storage device into a second hardware component;

recognizing said second hardware component out of said plurality of hardware components;

identifying a second profile out of said plurality of profiles containing a second configuration file associated with said second hardware component in response to recognizing said second hardware component; and presenting said second configuration file to said second hardware component based on said rules of said second profile.

6. The method as recited in claim 5, wherein said first and second hardware components are part of a cloud computing environment.

7. The method as recited in claim 1, wherein said plurality of hardware components comprises network switches, storage controllers and compute blades.

* * * * *